United States Patent
Thompson

(10) Patent No.: US 6,846,003 B2
(45) Date of Patent: Jan. 25, 2005

(54) FOLDING TRAILER

(76) Inventor: Donald Austin Thompson, 132 Green Ct., Mocksville, NC (US) 27028

(*) Notice: Subject to any disclaimer, the term of this patent is extended or adjusted under 35 U.S.C. 154(b) by 106 days.

(21) Appl. No.: 10/301,958

(22) Filed: Nov. 22, 2002

(65) Prior Publication Data

US 2003/0102655 A1 Jun. 5, 2003

Related U.S. Application Data

(63) Continuation-in-part of application No. 10/002,588, filed on Dec. 5, 2001, now abandoned.

(51) Int. Cl.[7] .............................................. B62B 33/02
(52) U.S. Cl. ....................... 280/656; 280/639; 280/651
(58) Field of Search .............................. 280/656, 491.1, 280/491.3, 491.4, 639, 38, 39, 40, 641, 645, 651, 400

(56) References Cited

U.S. PATENT DOCUMENTS

| | | | | |
|---|---|---|---|---|
| 1,289,997 A | * | 12/1918 | Wyeth | 296/26.11 |
| 2,169,076 A | * | 8/1939 | Silverstein | 296/35.3 |
| 2,809,046 A | * | 10/1957 | Bror | 280/639 |
| 3,305,243 A | * | 2/1967 | Manfredi, Jr. et al. | 280/651 |
| 3,582,131 A | * | 6/1971 | Brown | 296/26.02 |
| 3,612,600 A | * | 10/1971 | Salichs | 296/181.7 |
| 4,057,282 A | * | 11/1977 | Kidd | 296/10 |
| 4,239,258 A | * | 12/1980 | Burris | 280/639 |
| 4,786,073 A | * | 11/1988 | Harper | 280/656 |
| 4,822,069 A | * | 4/1989 | Burgess | 280/402 |
| 5,342,162 A | * | 8/1994 | Robinette et al. | 414/483 |
| 5,558,486 A | * | 9/1996 | Paproski | 414/537 |
| D376,564 S | * | 12/1996 | Mishoe | D12/101 |
| 5,673,928 A | * | 10/1997 | Jury | 280/645 |
| 5,688,099 A | * | 11/1997 | Fischer | 414/537 |
| 5,924,836 A | * | 7/1999 | Kelly | 414/482 |
| 6,254,117 B1 | * | 7/2001 | Cross | 280/401 |
| 6,474,714 B1 | * | 11/2002 | Stettner | 296/26.08 |
| 6,659,497 B1 | * | 12/2003 | Owens | 280/656 |

* cited by examiner

Primary Examiner—Christopher P. Ellis
Assistant Examiner—Kelly E Campbell
(74) Attorney, Agent, or Firm—David A. Greenlee

(57) ABSTRACT

A folding trailer has pivotally connected front, main and rear sections movable from an unfolded condition to a folded condition, in which the rear section pivots 270° to lie atop the main section, and the front section pivots 90° to nest within the main section. This provides a folded compact arrangement approximately 48"×80". When unfolded, the trailer produces an inside dimension of approximately 60"× 96", enabled by the front section thin walls that are interiorly nearly as wide as the main and rear sections. An extensible handle facilitates folding and unfolding the rear section.

10 Claims, 5 Drawing Sheets

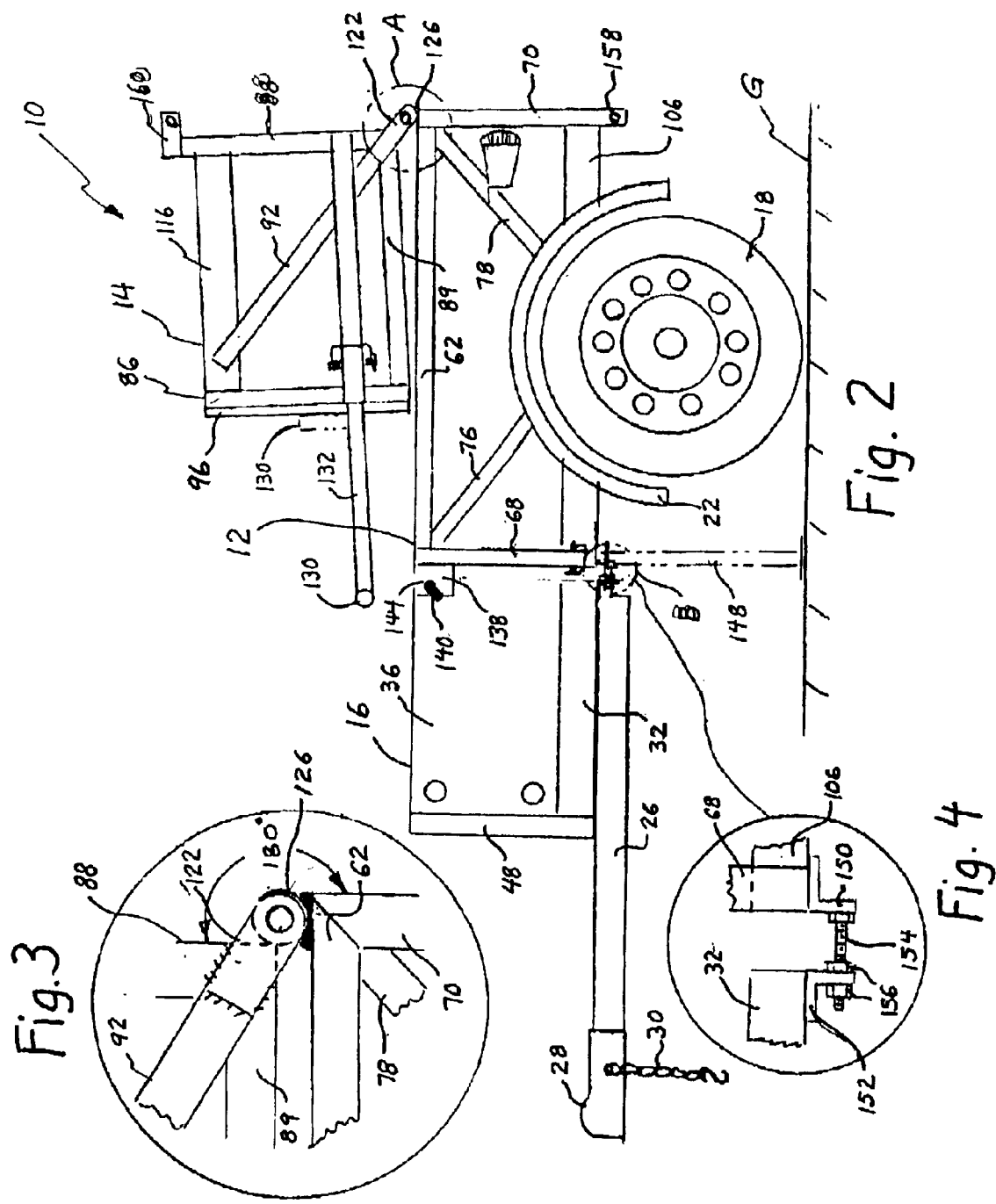

FOLDING TRAILER

RELATED APPLICATIONS

This application is a continuation-in-part of U.S. application Ser. No. 10/002,588, filed Dec. 5, 2001 now abandoned.

BACKGROUND OF THE INVENTION

1. Field of the Invention

This invention relates to vehicle trailers and, more particularly, to such a trailer that folds into a compact condition for storage.

2. Prior Art

Small trailers have long been produced for personal hauling when attached to a car or pickup truck. These trailers are frequently used to transport wheeled lawn maintenance mowers, small tractors, motorcycles, ATVs and snowmobiles. Many of these trailers are approximately 8' long×5' wide to avoid mandatory lighting requirements for larger trailers.

Most of these trailers are used infrequently and must be stored when not used. This poses a problem for the average homeowner, since a trailer that large must oftentimes be stored in a garage in areas where zoning restricts outside storage. Thus, attempts have been made to make trailers which fold for more compact storage. Examples of these prior art attempts are found in U.S. Pat. No. 4,239,258—Burris and U.S. Pat. No. 4,786,073—Harper. Both of these patents feature trailers which have front and rear sections that fold up on a middle section. Harper's trailer is full width when unfolded, but has no sides. One embodiment of Burris telescopes for storage, which is a complex mechanical arrangement that requires three sections of different width and consequent reduced usable floor width when extended. Another embodiment requires removal of the sides for folding. Both folding arrangements have floor-level hinges and close-by locking pins, which provides minimal structural strength when unfolded.

Thus, there is a need for a folding trailer that has maximum unfolded floor width, yet does not require removal of the sides for folding, and has improved structural strength when unfolded.

SUMMARY OF THE INVENTION

It is an object of this invention to provide a folding trailer that has maximum unfolded floor width, yet does not require removal of the sides for folding, and has improved structural strength when unfolded.

In one aspect, this invention features a folding trailer having main and rear sections movable between folded and unfolded conditions, wherein the rear and main sections each have a floor and upstanding sides, and the main section mounts aligned road wheels. Both sections have substantially the same inside width between side walls, and a first pivot connects the rear and main sections along a transverse axis near the tops of the sides, thereby enabling pivotal movement of the rear section to a position atop the main section in folded condition.

In another aspect, this invention features such a trailer that has a front section having a forwardly-extending tongue, a floor, and upstanding thin flat sides having an outside width slightly less than the inside width of the main section. A second pivot connects the main and front sections along a second transverse axis near the floors of both sections, thereby enabling pivotal movement of the front section to a position nested within the main section in folded condition.

Preferably, a handle is carried on one side of the rear section and is extensible to facilitate manual movement of the rear section between unfolded and folded conditions.

These and other objects and features of this invention will become more readily apparent upon reference to the following detailed description and the attached drawings, in which:

DESCRIPTION OF THE DRAWINGS

FIG. 2 is a side view of the trailer of FIG. 1, shown with the rear section folded;

FIG. 3 is an enlarged view of the detail denoted "A" in FIG. 2;

FIG. 4 is an enlarged view of the detail denoted "B" in FIG. 2;

DESCRIPTION OF THE PREFERRED EMBODIMENT

Figure 1:
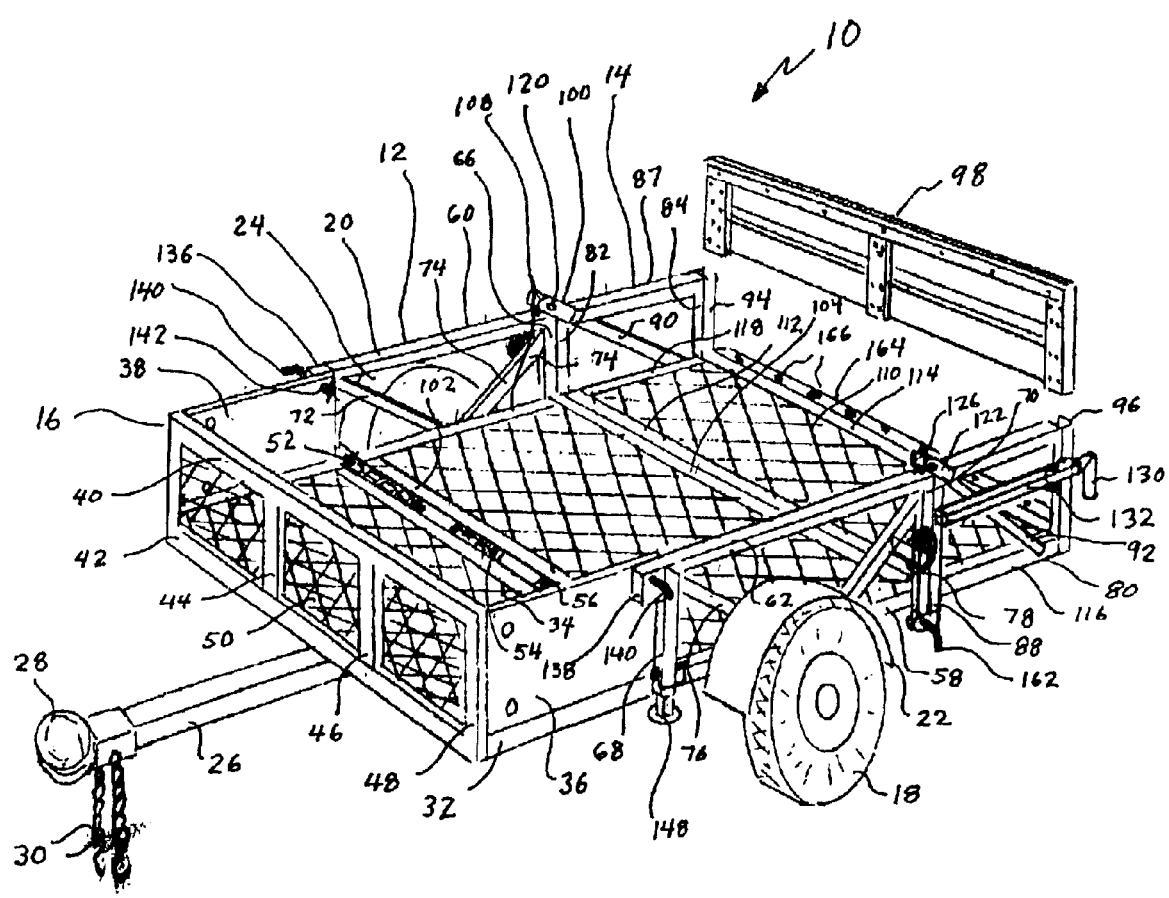
FIG. 1 is a perspective view of a folding trailer according to this invention, shown in unfolded condition.

Referring now to FIG. 1 of the drawings, a folding trailer 10 includes a main section 12, a rear section 14 and a front section 16. Main section 12 conventionally mounts road wheels 18, 20 on an axle and fenders 22, 24. Front section 16 mounts a towing tongue 26 that has a conventional attachment socket 18 and retention chains 30. Front section 16 has a peripheral metal frame 32, an expanded metal floor 34, and a thin sheet steel side walls 36, 38. A front wall is formed of a top rail 40, uprights 42, 44, 46, 48 that frame expanded metal 50.

Three hinges 52, 54, 56 pivotally connect front section 16 to the perimeter floor frame 58 of main section 12 at floor level. The side walls of main section 14 comprise top rails 60, 62, uprights 64, 66, 68, 70, and braces 72, 74, 76, 78. Rear section 14 has a perimeter frame 80, sides made up of uprights 82, 84, 86, 88, top rails 87, 89, and cross braces 90, 92. Rear uprights 84, 88 mount channels 94, 96 that slidingly receive a removable tailgate 98.

Main section perimeter frame 58 mounts an expanded metal floor 100 and includes a front rail 102, mounting hinges 52, 54, 56, a rear rail 104, and side rails 106, 108. The rear section perimeter frame 80 mounts an expanded metal floor 110 and includes a front rail 112, a rear rail 114, and side rails 116, 118.

Figure 6:
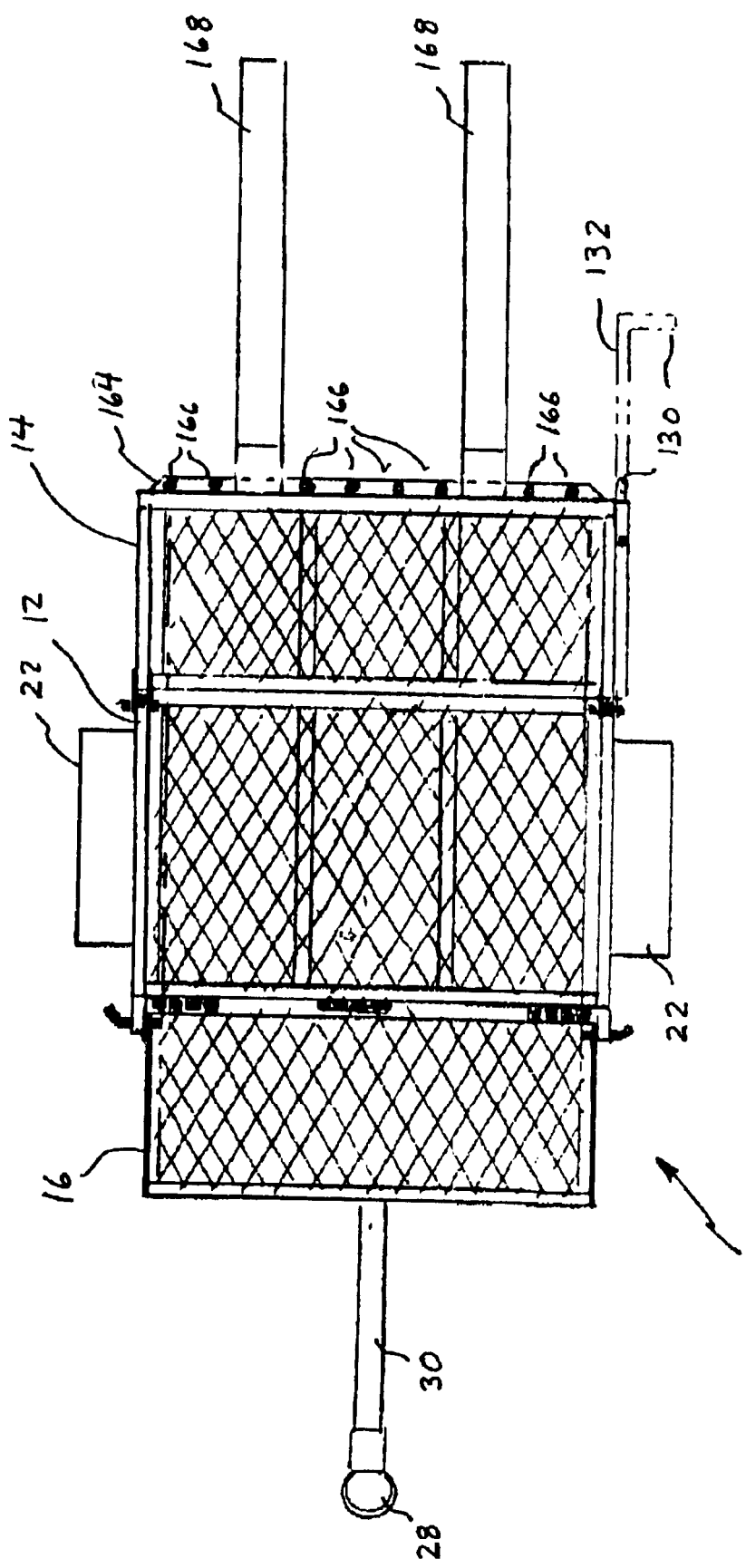
FIG. 6 is a plan view of the trailer of FIG. 1, shown in unfolded condition, with ramps attached.

Referring additionally to FIGS. 2 and 3, rear section side rails extend beyond the juncture of uprights 82, 88 and the respective top rails 87, 89 to flanged ends 120, 122, which embrace and are pivoted to bosses 124, 126 mounted on the ends of center section uprights 66, 70. In this manner, rear section 14 can pivot from the FIG. 1 unfolded condition, up and over atop main section 12 to the FIG. 32 folded condition. To assist in this approximately 180° pivotal movement, a handle 130 at the end of a rod 132 is extensible from a storage position (FIG. 1,), in a channel 134 mounted on one side of rear section 14, to an operative position (FIG. 2, phantom lines FIG. 6). In operative position, handle 130 can be manually grasped to swing rear section 14 over atop main section 12 in a controlled manner by an operator walking beside trailer 10. Handle 130 is also used in the same manner to return rear section 14 to its unfolded FIG. 1 condition.

Referring now to FIGS. 2, 4, 5 and 6, it can be seen that locking plates 136, 138 are welded to the upper ends of main section uprights 64, 68 and each carries a locking pin 140. In the unfolded FIGS. 1 and 2 condition, these pins 140 are received in holes 142, 144 to lock front section 16 in unfolded condition. To fold front section, pins 140 are removed from front section holes 142, 144, and tongue 26 is grasped and lifted, pivoting front section 16 approximately 90° up and within main section 12 to the FIG. 5 folded condition. The use of thin metal walls 36, 38 on front section 16 enables this nesting movement, while maintaining the width of front section floor 34 nearly as wide as floors 100, 110 of the main 12 and rear 14 sections.

Figure 5:
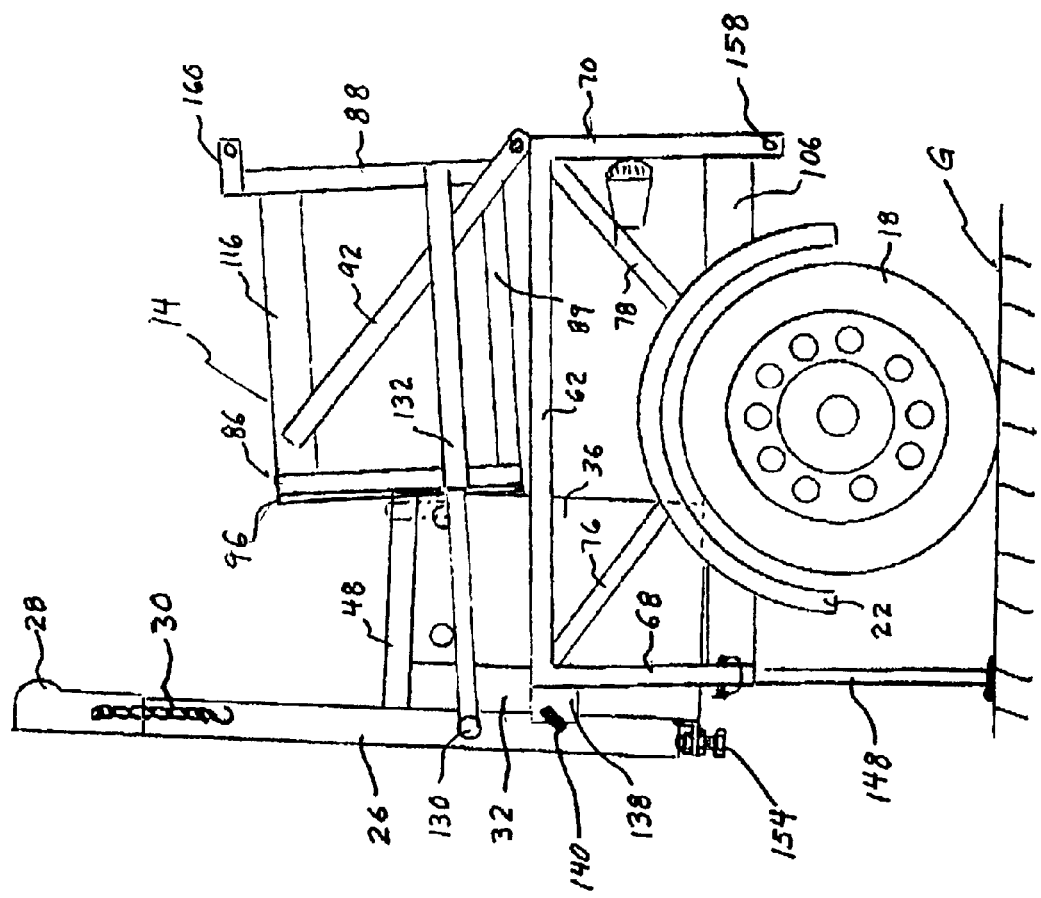
FIG. 5 is a side view of the Trailer of FIG. 1, shown in fully folded condition, with its stabilizing legs extended.

Trailer 10 is supported during folding and in folded condition by a pair of extensible legs, only one of which 148 is shown, which are stored within, and are extensible from uprights 64, 68 to engage the ground G. In both folded and unfolded conditions, the center of weight of trailer (not shown) is located forward of the ground contact point of wheels 18 so that some of the trailer weight is borne by the tongue 26, and hence by the towing vehicle, during unfolded operation, and by legs 148 during folded storage condition, as shown in FIG. 5. To assure alignment of pins 140 with holes 142, 144 in unfolded condition, a position adjustment is provided, as shown in FIG. 4. An angle bracket 150 is welded to the bottom front of main section side rail 106. A similar, but apertured bracket 152 is welded to the bottom rear of front section side rail 32, and mounts a threaded stud 154 that is adjustably positioned by nuts 156 to angularly position front section 16 relative to main section 12 so that latch pins 140 with holes 142, 144.

In the folded condition of FIG. 5, front section 16 is maintained in folded condition by the reinsertion of pins 140 which extend in front of the bottom of front frame 32. The lower ends of main section uprights 66, 70 include locking holes 158, while apertures brackets 160 are welded to the bottoms of rear section uprights 82, 88 so that locking pins 162 secure rear section 14 in unfolded condition, as shown in FIG. 1, and prevent its movement out of this.

Figure 7:
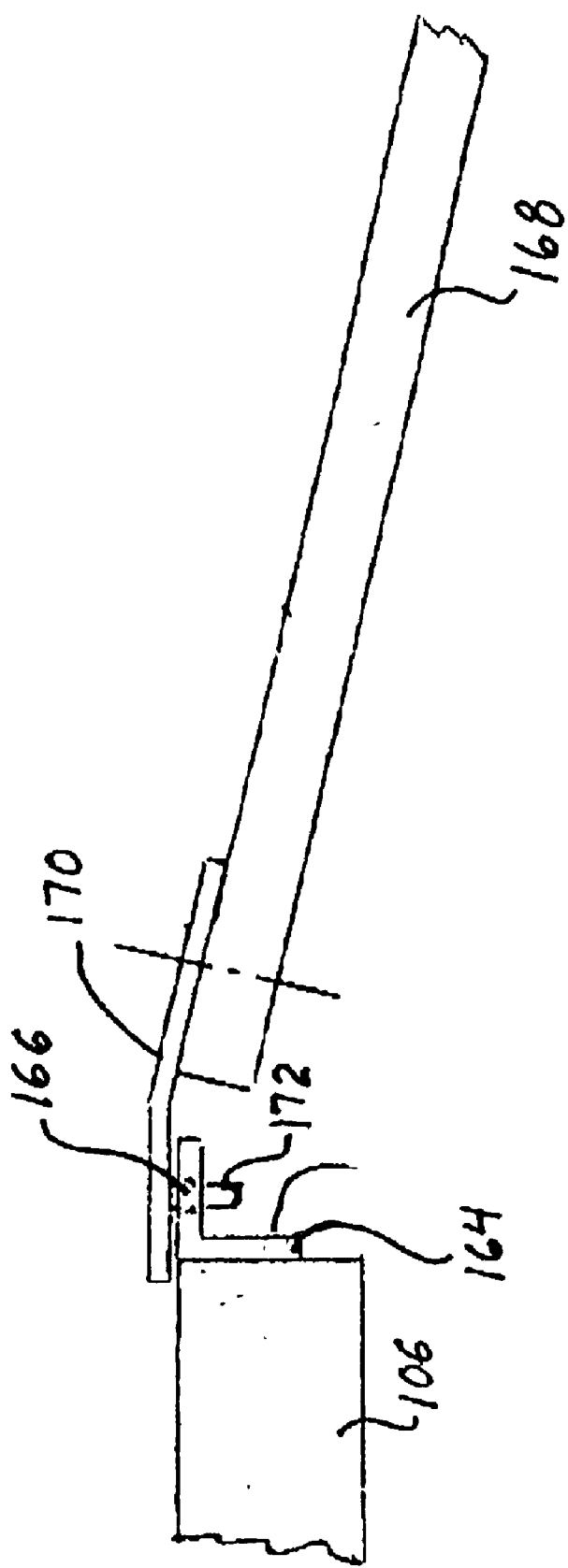
FIG. 7 is a detail view showing the ramp attachment to the trailer.

As shown in FIGS. 1 and 6, an angle bracket 164 is welded to rear section rear rail 114 and contains spaced holes 166. A pair of ramps 168 each have a flange 170 welded to one end. A pin 172 is welded to the bottom of each flange 170 and can be inserted into holes 166, as shown in FIGS. 6 and 7, to secure ramps 168 to bracket 164 to enable wheeled vehicles and implements to be loaded onto and unloaded from trailer 10. Ramps 168 are easily removed for storage when not used.

Thus, this invention, in the form described above, provides a folding trailer that has maximum unfolded floor width, yet does not require removal of the sides for folding, and has improved structural strength when unfolded. Many obvious modifications will become apparent to one skilled in the art, and are intended to be covered by the appended claims.

What is claimed is:

1. A folding trailer having main, front and rear sections movable between folded and unfolded conditions, wherein the rear, front and main sections each have a floor and upstanding side walls, and the main section mounts aligned road wheels, characterized by
   both the main and rear sections having substantially the same inside width between side walls,
   first pivot means connecting the rear and main sections along a transverse axis near the tops of the side walls, thereby enabling pivotal movement of the rear section to a position atop the main section in folded condition,
   the front section having a forwardly-extending tongue, a floor, and upstanding thin flat side walls having an outside width slightly less than the inside width of the main section side walls, and including second pivot means connecting the main and front sections along a second transverse axis near the floors of both sections, thereby enabling pivotal movement of the front section to a position nested within the main section in folded condition.

2. The folding trailer of either of claims 1, including a handle carried on one side of the rear section and extensible to facilitate manual movement of the rear section between unfolded and folded conditions.

3. The folding trailer of either of claims 1, including a removable end gate carried by side channels mounted on the sides of the of the rear section side walls.

4. The folding trailer of either of claims 1, wherein the rear section mounts a flange having spaced apertures, and including a pair of ramps each having a pin insertable in an aperture to removably mount the ramps on the trailer to facilitate loading/unloading wheeled vehicles.

5. The folding trailer of either of claims 1, wherein the sides and floors are sized to provide an interior floor size of approximately 60" in width and 96" in length.

6. The folding trailer of claim 5, wherein the trailer has outside dimensions of at least approximately 48" front-to-back and 80" or less in width in folded condition.

7. The folding trailer of claim 1, including a first locking hole located near the top front edge of one wall of the main section and a second locking hole located near the adjacent upper rear wall of the front section, and a pin insertable through the locking holes when aligned to lock the front and main sections together.

8. The folding trailer of claim 7, including adjustment means for adjusting the angularity between the front and main sections to assure alignment of the front and main sections in unfolded condition.

9. The folding trailer of claim 8, wherein the first locking hole is positioned such that when the pin is reinserted therein in folded condition provides a barrier to movement of the front section out of folded position.

10. The folding trailer of either of claims 1, wherein the center of weight of the trailer is located forwardly of the ground contact point of the wheels in both folded and unfolded conditions, and including at least one storage leg carried by the main section forwardly of the center of weight, said leg being extensible to stabilize the trailer in folded condition.

* * * * *